United States Patent
Chang

(12) United States Patent (10) Patent No.: US 7,007,225 B2
Chang (45) Date of Patent: Feb. 28, 2006

(54) C3 MODULE OPERATION METHOD OF OPTICAL STORAGE APPARATUS

(75) Inventor: Wen-Jeng Chang, Kaohsiung (TW)

(73) Assignee: VIA Technologies, Inc., Taipei Hsien (TW)

(*) Notice: Subject to any disclaimer, the term of this patent is extended or adjusted under 35 U.S.C. 154(b) by 341 days.

(21) Appl. No.: 10/115,781

(22) Filed: Apr. 3, 2002

(65) Prior Publication Data
US 2002/0184591 A1 Dec. 5, 2002

(30) Foreign Application Priority Data
Jun. 5, 2001 (TW) .............................. 90113547 A

(51) Int. Cl.
*H03M 13/00* (2006.01)
(52) U.S. Cl. .................................................... 714/774
(58) Field of Classification Search ................ 714/774, 714/755, 785
See application file for complete search history.

(56) References Cited

U.S. PATENT DOCUMENTS

| 5,204,593 A | * | 4/1993 | Ueki ........................... 318/254 |
| 5,918,204 A | * | 6/1999 | Tsurumaru ................... 704/214 |
| 6,003,151 A | | 12/1999 | Chuang ....................... 714/752 |
| 6,038,672 A | * | 3/2000 | Klein .......................... 713/322 |
| 6,209,112 B1 | * | 3/2001 | Stevenson ................... 714/752 |

* cited by examiner

*Primary Examiner*—Joseph Torres
(74) *Attorney, Agent, or Firm*—J.C. Patents

(57) ABSTRACT

A C3 module in an optical storage apparatus and operation method thereof are disclosed. When the format of data to be read is audio, the C3 module enters a power saving mode. When the data format is non-audio, the C3 module enters an operation mode. The C3 module has an error correction module and an error detection module. When the error correction module is operating, the error detection module enters the power saving mode. When the operation of the error detection module is finished, the error correction module enters a power saving mode. When the error detection module is operating, the error correction module enters the power saving mode. When the operation of the error detection module is finished, the error detection module enters the power saving mode.

13 Claims, 2 Drawing Sheets

C3 MODULE OPERATION METHOD OF OPTICAL STORAGE APPARATUS

CROSS-REFERENCE TO RELATED APPLICATION

This application claims the priority benefit of Taiwan application serial no. 90113547, filed on Jun. 5, 2001.

BACKGROUND OF THE INVENTION

1. Field of the Invention

The invention relates in general to a power saving method of an optical storage apparatus, and more particularly, to a power saving method for a C3 module in an optical storage apparatus. The invention reduces the power consumption and meets the environmental energy efficiency requirements.

2. Description of the Related Art

Optical storage apparatuses such as well-known CD-ROM drive, CD-RW drive and DVD-ROM drive have been broadly applied to program and data storage. For example, while a program is installed or configured, the program data is transmitted from the CD-ROM disk to the magnetic storage apparatus of the computer system first. When the program data is stored in the magnetic storage apparatus, the original CD-ROM disk may be not accessed future.

Some programs may be not stored in the hard disk permanently, such as sound and image. This kind of program and application program require a storage apparatus that reads data from the CD-ROM and transmits data to the computer system at a very high speed. In the past, the transmission rate of data from the CD-ROM has been a bottleneck. To break through this bottleneck, the access speed of the modem CD-ROM has been increased. Consequently, the speed at which data is read from the CD-ROM is also increased. With this trend, the power required by the C3 module responsible for executing data error correction and detection is continuously increased, and how to reduce the power consumption becomes an important topic.

The format of an optical storage apparatus can be characterized into an audio format and other format. While processing data in audio format, the error correction and detection are not normally required since the error tolerance is higher. However, in the prior art, the C3 module is still in an operation mode while processing audio. Consequently, addition power is consumed. On the other hand, even in processing non-audio data, some internal modules of the C3 module are not always in the operation mode, so additional power is further consumed. Therefore, there is an improvement to reduce power consumption in C3 module.

SUMMARY OF THE INVENTION

The invention provides a method of operating the C3 module in an optical storage apparatus. The C3 module comprises a C3 management module, an error correction module and an error detection module. The error correction module further comprises an error correction management module, a syndrome calculation module and an error search and correction module. The error correction module corrects data read from a compact disk according to an error correction code (ECC), while the error detection modules detects whether there is an error in data corrected by the error correction module according to an error detection code (EDC). When the format of data to be read from an optical storage medium is audio, the C3 module enters the power saving mode. When the format of data to be read is not audio, the C3 module enters the operation mode. When the C3 module enters the operation mode, the operation thereof further comprises the following modes. That is, when the error correction module is operating, the error detection module enters the power saving mode. When the error correction module terminates the operation mode, the error correction module enters the power saving mode. When the error detection module is operating, the error correction module enters the power saving mode. After the operation mode of the error detection module, the error detection module enters the power saving mode.

When the error correction module is operating, the operation method further comprises the following steps. The syndrome calculation module calculates a syndrome value. When the syndrome value is zero, the error search and correction module enters the power saving mode. When the syndrome value is not zero, the error search and correction module enters the operation mode. When the operation of the syndrome calculation module is finished, the syndrome calculation module enters the power saving mode. After the operation mode, the error search and correction module enters the power saving mode.

The invention not only makes the unused modules enter the power saving mode in time, but also achieves the objective of saving energy.

Both the foregoing general description and the following detailed description are exemplary and explanatory only and are not restrictive of the invention, as claimed.

DESCRIPTION OF THE PREFERRED EMBODIMENTS

Figure 1:
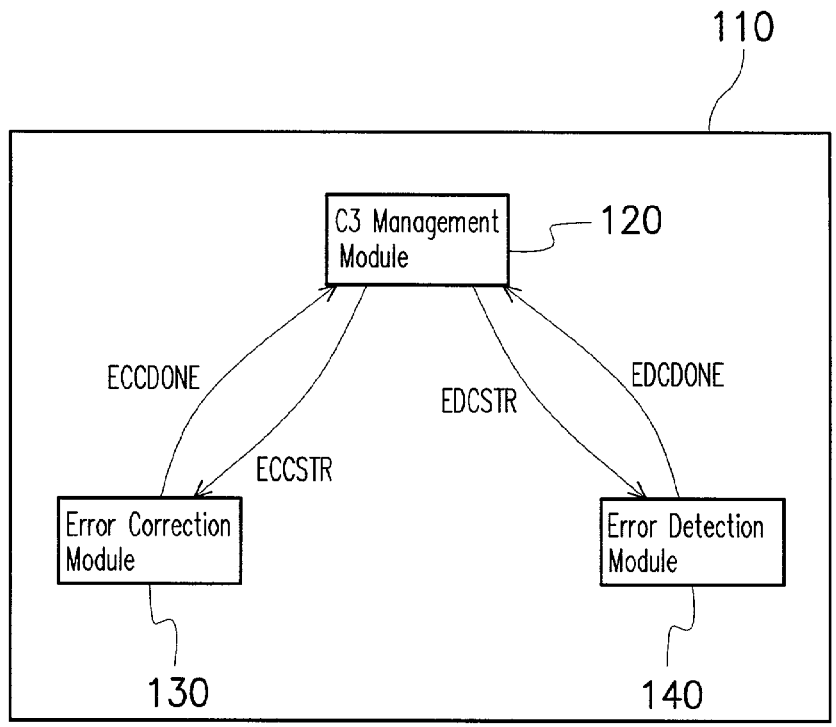
FIG. 1 shows a C3 module of an optical storage apparatus according to the invention.

FIG. 1 shows the C3 module in an optical storage apparatus. The C3 module 110 is used to process the C3 operation of the optical storage apparatus. The C3 module 110 comprises a C3 management module 120, an error correction module 130 and an error detection module 140. In addition to transmitting and receiving a signal to and from the error correction module 130 and the error detection module 140, the C3 management module 120 has other functions. The error correction module 130 corrects data read from the optical storage medium (such as a CD-ROM) according to error correction code (ECC). The error detection module 140 detects whether error exists in data already corrected by the error correction module 130 according to error detection code (EDC). When data format in the optical storage medium is audio, the C3 module 110 enters the shut down mode, that is, the power saving mode. When the data format of the optical storage apparatus is non-audio, the C3 module 110 enters an operation mode.

When the C3 module 110 enters the operation mode, the method for saving power includes the following steps. When the C3 management module 120 outputs an error correction operation signal ECCSTR to the error correction module 130, the error correction module 130 enters the operation mode, and the error detection module 140 enters the power saving mode. When the error correction module 130 finishes the operation and outputs an error correction done signal ECCDONE to the C3 management module 120, the error correction module 130 enters the power saving mode. The C3 management module 120 outputs an error detection operation signal EDCSTR to the error detection module 140, and then the error detection module 140 enters the operation mode. When the error detection module 140 finishes the operation and outputs an error detection done signal EDCDONE to the C3 management module 120, the error detection module 140 enters the power saving mode.

Figure 2:
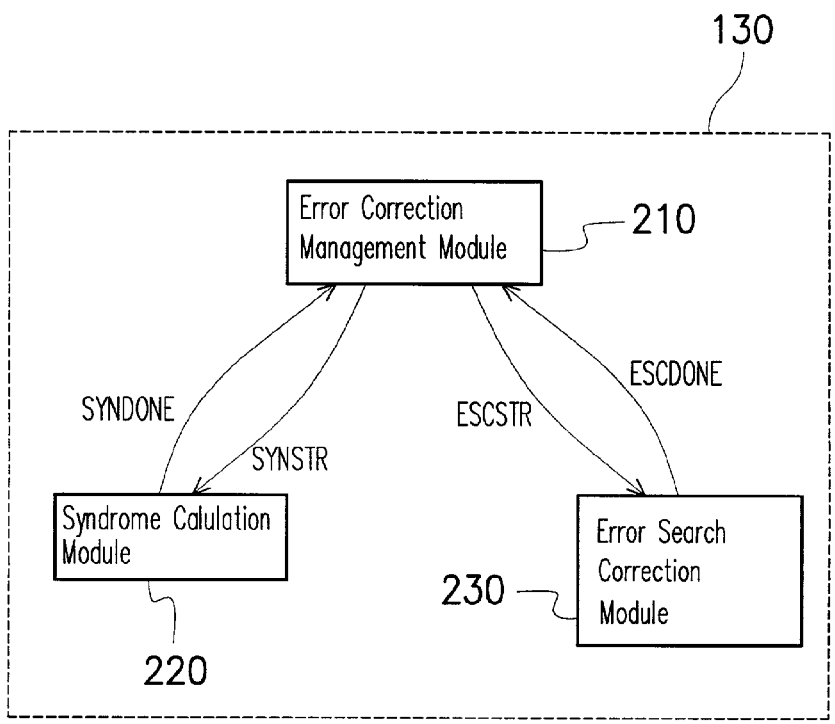
FIG. 2 shows a power saving mode of the error correction module as shown in FIG. 1.

To further enhance the power saving efficiency, the power saving mode can be applied to some internal units in the error correction module 130. In FIG. 2, the power saving mode of the error correction module 130 as shown in FIG. 1 is illustrated. The error correction module 130 comprises an error correction management module 210, a syndrome calculation module 220 and an error search and correction module 230. In addition to transmitting and receiving a signal to and from the syndrome calculation module 220 and the error search and correction module 230, the error correction management module 210 has other functions. The syndrome calculation module 220 can calculates a syndrome value. When the syndrome value is zero, it indicates that data read from the CD-ROM is correct. When the syndrome value is not zero, it indicates that data read from the is incorrect. The error search and correction module 230 then searches the position of the error and corrects error.

The power saving method when the error correction module 130 enters the operation mode includes the following steps. When the error correction management module 210 outputs a syndrome calculation operation signal SYNSTR to the syndrome calculation module 220, a syndrome value is calculated thereby. When the syndrome value is zero, the error search and correction module 230 enters the power saving mode. When the syndrome value is not zero, the error correction management module 210 outputs an error search and correction signal ESCSTR to the error search and correction module 230, and the error search and correction module 230 then enters the operation mode. After the operation of the error correction and search module 230 is finished, an error search and correction done signal ESCDONE is output to the error correction management module 210 thereby. After entering the power saving mode and the error search and correction module 230 enters the operation mode again while the syndrome value is not equal to zero. After the end of operation mode of the syndrome calculation module 220, a syndrome calculation done signal SYSDONE is output to the error correction management module 210 thereby, and then the syndrome calculation module 220 enters the power saving mode.

Figure 3:
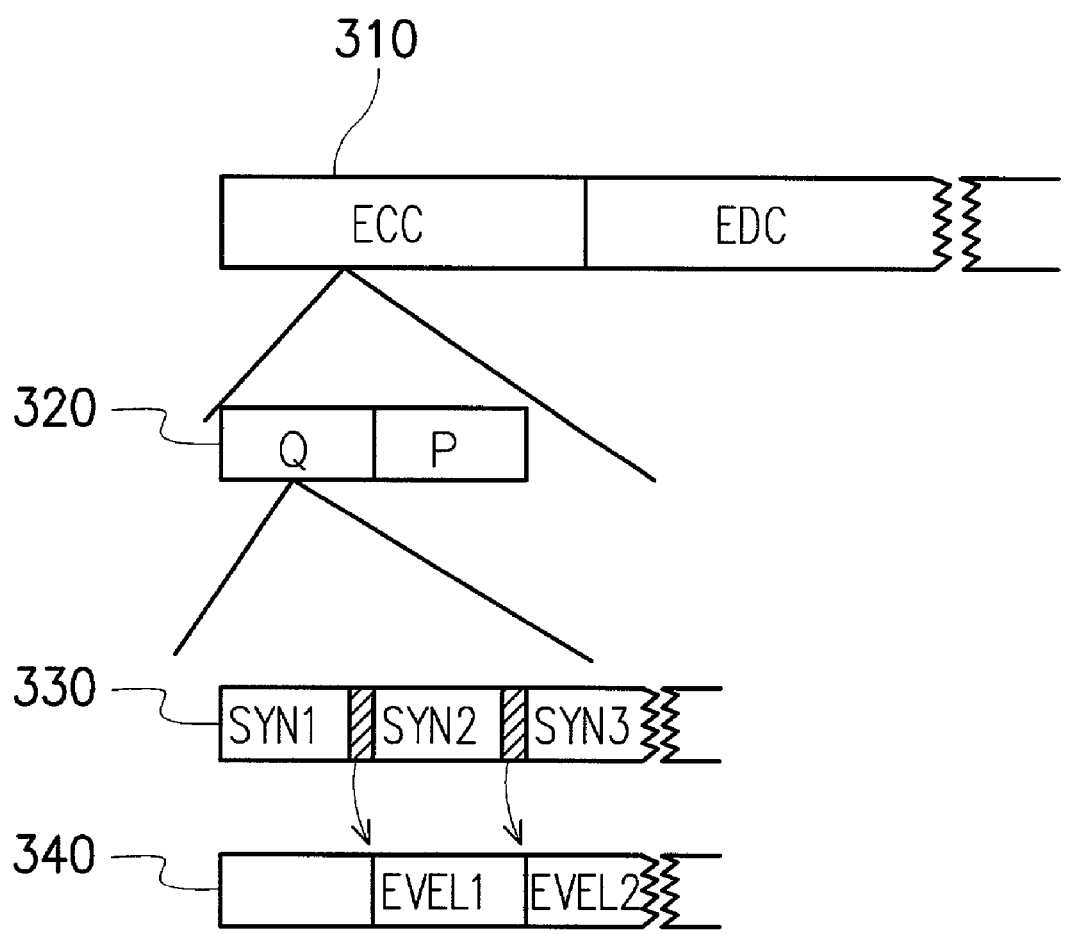
FIG. 3 shows operation of the C3 module in the optical storage apparatus according to the invention.

In FIG. 3, the operation of the C3 module in the optical storage apparatus is shown. Referring to both FIGS. 1 and 2, the C3 operation as shown in FIG. 3 includes an ECC and EDC operation pipeline 310, a Q-vector and P-vector operation pipeline 320, a syndrome calculation operation pipeline 330 and an error search and correction operation pipeline 340. The ECC and EDC operation pipeline 310 perform the ECC calculation and then EDC calculation. The ECC calculation is divided into the Q-vector and the P-vector operation pipeline 320. The Q-vector calculation is performed prior to the P-vector calculation. The Q-vector calculation is further divided into a syndrome calculation operation pipeline 330 and the error search and correction operation pipeline 340. Because the ECC calculation and EDC calculation performed in the same pipeline, the power saving mechanism of the invention is easier to understand and described accompanied with FIG. 1. Since the syndrome calculation operation pipeline 330 and the error search and correction operation pipeline 340 are parallel, a syndrome value is calculated while the syndrome calculation module 220 is operating. For example, the hatched portion after the SYN1 segment indicates that the SYN1 segment of the syndrome calculation operation pipeline 330 is at the power saving mode to further enhance the power saving efficiency. When the syndrome value is not zero, the error search and correction module 230 enters the operation mode. For example, for the EVEL1 segment of the syndrome calculation operation pipeline 330, when the syndrome calculation operation pipeline 330 is operating in the SYN2 segment, a series of calculation for the syndrome is performed thereby. Such power saving mechanism can be further understood with the illustration shown in FIG. 2.

According to the above, the invention has the following advantages. The C3 module can enter the power saving mode at an appropriate timing without affecting the operation performance to save the energy.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. An operation method of a C3 module in an optical storage apparatus for reading data from a storage medium, the C3 module comprises an error correction module and an error detection module, the operation method comprising:
   having the C3 module in the optical storage apparatus enter a power saving mode when data format of the data read from the storage medium by the optical storage apparatus is audio; and
   having the C3 module in the optical storage apparatus enter an operation mode when data format of the data read from the storage medium by the optical storage apparatus is not audio, wherein in the operation mode, when the error correction module of the C3 module is operating, the error detection module of the C3 module enter the power saving mode, and when the error detection module of the C3 module is operating, the error correction module of the C3 module enter the power saving mode.

2. The operation method according to claim 1, further comprises the steps of:
   when the error correction module is operating, making the error detection module enter the power saving mode;
   when operation of the error correction module is finished, making the error correction module enter the power saving mode;
   when the error detection module is operating, making the error correction module enter the power saving mode; and
   when operation of the error detection module is finished, making the error detection module enter the power saving mode.

3. The operation method according to claim 2, wherein the error correction module further comprises a syndrome calculation module and an error search and correction module, and when the error correction module is operating, the operation method comprises:
   when the syndrome calculation module is operating, calculating a syndrome value, and when the syndrome value is zero, making the error search and correction module enter the power saving mode;
   when the syndrome value is not zero, making the error search and correction module enter the operation mode;
   when operation of the syndrome calculation module is finished, making the syndrome calculation module enter the power saving mode; and when operation of the error search and correction module is finished, making the error search and correction module enter the power saving mode.

4. The operation method according to claim 3, wherein the error correction module further comprises an error correction management module, and the operation method further comprises:

when the error correction management module outputs a syndrome calculation operation signal to the syndrome calculation module, calculating the syndrome value by the syndrome calculation module, and when the syndrome value is zero, making the error search and correction module enter the power saving mode;

when the syndrome value is not zero, outputting an error search and correction operation signal to the error search and correction module by the error correction management module and then making the error search and correction module enter the operation mode;

when operation of the error search and correction module is finished, outputting an error search and correction done signal to the error correction management module, and making the error search and correction module enter the power saving mode; and when operation of the syndrome calculation module is finished, sending a syndrome calculation done signal to the error correction management module, and making the syndrome calculation module enter the power saving mode.

5. The operation method according to claim 2, wherein the C3 module further comprises a C3 management module, and the operation method further comprises: when the C3 management module outputs an error correction operation signal to the error correction module, making the error correction module enter the operation mode, and making the error detection module enter the power saving mode;

when the operation mode of the error correction module is finished, sending an error correction done signal to the C3 management module, making the error correction module enter the power saving mode, outputting an error detection operation signal to the error detection module by the C3 management module and then making the error detection module enter the operation mode; and making the error detection module enter the power saving mode when the error detection module outputting an error detection done signal to the C3 management module.

6. A C3 module of an optical storage apparatus, wherein the optical storage apparatus can read data from an optical storage medium, the C3 module comprising:

an error correction module, to detect and correct an error from data read from the storage medium by the optical storage apparatus; and an error detection module, to detect whether the data corrected by the error correction module has an error; wherein when data is in audio format, the C3 module enters a power saving mode; and when data is not in audio format, the C3 module enters an operation mode, wherein in the operation mode, when the error correction module of the C3 module is operating, the error detection module of the C3 module enter the power saving mode, and when the error detection module of the C3 module is operating, the error correction module of the C3 module enter the power saving mode.

7. The C3 module according to claim 6, wherein after operation of the error correction module is finished, the error correction module enters the power saving mode.

8. The C3 module according to claim 6, wherein when the operation of the error detection module is finished, the error detection module enters the power saving mode.

9. The C3 module according to claim 6, further comprising a C3 management module to control the error correction module and the error detection module, wherein;

when the C3 management module outputs an error correction operation signal to the error correction module, the error correction module enters the operation mode, and the error detection module enters the power saving mode;

when the operation mode of the error correction module is over and an error correction done signal is output to the C3 management module, the error correction module enters the power saving mode, the C3 management module outputs an error detection operation signal to the error detection module, which then enters the operation mode; and the error detection mode outputs an error detection done signal to the C3 management module when the operation mode thereof is over, and the error detection mode then enters the power saving mode.

10. The C3 module according to claim 6, wherein the error correction module further comprises:

a syndrome calculation module, to execute an error detection calculation to generate a syndrome value to determine whether there is any error in the data; and an error search and correction module, to search and correct an error value and an error position of the error.

11. The C3 module according to claim 10, wherein when the syndrome calculation module is operating, the syndrome value is calculated, and when the syndrome value is zero, the error search and correction module enters the power saving mode;

when the syndrome value is not zero, the error search and correction module enters the operation mode;

when the operation of the syndrome calculation module is finished, the syndrome calculation module enters the power saving mode; and when the operation of the error search and correction module is finished, the error search and correction module enters the power saving mode.

12. The C3 module according to claim 6, wherein the error correction module further comprises an error correction management module to control the syndrome calculation module and the error search and correction module.

13. The C3 module according to claim 12, wherein when the error correction management outputs a syndrome calculation operation signal to the syndrome calculation module, a syndrome value is calculated, and when the syndrome value is zero, the error search and correction module enters the power saving mode;

when the syndrome value is not zero, the error correction management module outputs an error search and correction operation signal to the error search and correction module, and then the error search and correction module enters the operation mode;

when the operation of the error search and correction module is finished, an error search and correction done signal is sent to the error correction management module, and the error search and correction module then enters the power saving mode; and when the operation of the syndrome calculation module is finished, a syndrome calculation over signal is output to the error correction management module, and the syndrome calculation module enters the power saving mode.

* * * * *

UNITED STATES PATENT AND TRADEMARK OFFICE
CERTIFICATE OF CORRECTION

PATENT NO. : 7,007,225 B2 Page 1 of 1
APPLICATION NO. : 10/115781
DATED : February 28, 2006
INVENTOR(S) : Wen-Jeng Chang It is certified that error appears in the above-identified patent and that said Letters Patent is hereby corrected as shown below:

Column 3, line 22, "calculates" should be --calculate--.

Column 4, line 30, "enter a power saving mode when data format of the data" should be --enter a power saving mode when a data format of the data--.

Column 4, line 34, "enter an operation mode when data format of the data" should be --enter an operation mode when the data format of the data--.

Column 4, line 39, "enter" should be --enters--.

Column 4, line 41, "enter" should be --enters--.

Column 5, line 45, "outputting" should be --outputs--.

Column 5, line 63, "enter" should be --enters--.

Column 5, line 65, "enter" should be --enters--.

Signed and Sealed this

Twenty-fourth Day of June, 2008

JON W. DUDAS
*Director of the United States Patent and Trademark Office*